US011904679B2

United States Patent
Hara et al.

(10) Patent No.: US 11,904,679 B2
(45) Date of Patent: Feb. 20, 2024

(54) ELECTRIC VEHICLE COOLING SYSTEM

(71) Applicant: TOYOTA JIDOSHA KABUSHIKI KAISHA, Toyota (JP)

(72) Inventors: Yasuhiro Hara, Nagoya (JP);
Norimasa Koreishi, Miyoshi (JP);
Jumpei Watanabe, Nagakute (JP);
Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/840,770

(22) Filed: Jun. 15, 2022

(65) Prior Publication Data
US 2022/0402351 A1 Dec. 22, 2022

(30) Foreign Application Priority Data

Jun. 22, 2021 (JP) ................. 2021-103520

(51) Int. Cl.
*B60K 11/04* (2006.01)

(52) U.S. Cl.
CPC .................. *B60K 11/04* (2013.01)

(58) Field of Classification Search
CPC .... B60K 11/04; B60K 1/00; B60K 2001/006; B60K 2001/003; B60K 2001/005; F01P 3/12; F01P 3/18; F01P 7/14; F01P 2003/182; F01P 2007/146
See application file for complete search history.

(56) References Cited

U.S. PATENT DOCUMENTS

| 10,941,695 | B2* | 3/2021 | Tholander | .......... B60H 1/00278 |
| 2011/0114402 | A1 | 5/2011 | Inoue et al. | |
| 2014/0202660 | A1* | 7/2014 | Seligman | ................ F01P 3/18 |
| | | | | 165/96 |
| 2019/0105968 | A1* | 4/2019 | Rice | ..................... B60L 58/26 |
| 2020/0018222 | A1 | 1/2020 | Tholander et al. | |
| 2022/0194215 | A1* | 6/2022 | Springer | .............. B60K 11/085 |
| 2022/0388367 | A1* | 12/2022 | Simofi-Ilyes | .......... B60K 11/02 |

FOREIGN PATENT DOCUMENTS

| EP | 1726470 A1 | 11/2006 |
| JP | S56-171335 U | 12/1981 |
| JP | 2005-219531 A | 8/2005 |
| JP | 2006-327259 A | 12/2006 |
| JP | 2008-056152 A | 3/2008 |
| JP | 2010018057 A | 1/2010 |
| JP | 2017-190096 A | 10/2017 |

OTHER PUBLICATIONS

Fujita, Kazuhide, Examiner, Japanese Office Action dated Nov. 7, 2023 in Japanese Patent Application No. 2021-103520.

* cited by examiner

*Primary Examiner* — Grant Moubry
(74) *Attorney, Agent, or Firm* — Dinsmore & Shohl LLP (57) ABSTRACT

An electric vehicle cooling system, including: a first radiator installed at a vehicle and configured to cool a power unit driven by electrical power; and a second radiator installed at the vehicle, disposed at a vehicle front side of the first radiator, and configured to cool an autonomous driving control device configured to control autonomous driving of the vehicle.

4 Claims, 9 Drawing Sheets

ELECTRIC VEHICLE COOLING SYSTEM

CROSS-REFERENCE TO RELATED APPLICATION

This application is based on and claims priority under 35 USC 119 from Japanese Patent Application No. 2021-103520 filed on Jun. 22, 2021, the disclosure of which is incorporated by reference herein.

BACKGROUND

Technical Field

The present disclosure relates to an electric vehicle cooling system.

Related Art

A disclosure related to a hybrid vehicle is disclosed in Japanese Patent Application Laid-Open (JP-A) No. 2010-18057. This hybrid vehicle includes an engine radiator and a hybrid radiator. This accordingly enables an engine to be cooled with the engine radiator, and an inverter unit and a motor to be cooled with the hybrid radiator.

However, the engine radiator is not needed in cases in which the above related technology is applied to an electric vehicle since there is no engine installed in an electric vehicle. However, the engine radiator and the hybrid radiator in the above related technology are the same from the perspective of cooling a power unit of a vehicle, and there is a need to separately provide a radiator for cooling an autonomous driving control device in cases in which the above related technology is applied to an autonomous driving vehicle.

However, there is no reference in JP-A No. 2010-18057 to cooling an autonomous driving control device, and so the above related technology has room for improvement from the perspective of cooling an autonomous driving control device while also cooling a power unit for an electric vehicle capable of autonomous driving.

SUMMARY

The present disclosure obtains, for an electric vehicle capable of autonomous driving, an electric vehicle cooling system that enables an autonomous driving control device to be cooled while cooling a power unit.

An electric vehicle cooling system according to a first aspect of the present disclosure includes a first radiator installed at a vehicle and configured to cool a power unit driven by electrical power, and a second radiator installed at the vehicle, disposed at a vehicle front side of the first radiator, and configured to cool an autonomous driving control device configured to control autonomous driving of the vehicle.

According to the first aspect of the present disclosure, the first radiator is installed at the vehicle, and the power unit can be cooled by the first radiator even in cases in which the power unit is heated up by the power unit of the vehicle being driven by electrical power.

In some embodiments, an autonomous driving control device to control autonomous driving of the vehicle is also able to be cooled in cases in which the autonomous driving control device is installed at the vehicle. With regard to this point, although the autonomous driving control device might conceivably be cooled with the first radiator, in some embodiments, a separate radiator is installed at the vehicle for cases in which the operating temperature and the required heat dissipation amount for the autonomous driving control device differ from the operating temperature and the required heat dissipation amount for the power unit.

The present disclosure is accordingly provided with the second radiator, enabling the autonomous driving control device that has been heated up by operation to be cooled with the second radiator. Moreover, the specification of the second radiator can be appropriately set for the operating temperature and the required heat dissipation amount for the autonomous driving control device.

Furthermore, in the present disclosure the second radiator is disposed on the vehicle front side of the first radiator, enabling both the first radiator and the second radiator to be cooled with a single cooling fan.

An electric vehicle cooling system according to a second aspect of the present disclosure is the first aspect wherein the first radiator and the second radiator are supported at a frame of the vehicle via a common support member.

According to the second aspect of the present disclosure, the first radiator and the second radiator can be supported at the frame of the vehicle via the common support member. This means that even were the size or the like of the first radiator and the second radiator to change according to the specifications of the power unit and the autonomous driving control device, the locations where a design change is required can be limited to the support member and portions peripheral thereto.

An electric vehicle cooling system according to a third aspect of the present disclosure is the first aspect or the second aspect wherein the second radiator is disposed at an incline such that a gap between the second radiator and the first radiator widens on progression from a vehicle lower side to a vehicle upper side as viewed along a vehicle width direction.

According to the third aspect of the present disclosure, the second radiator is disposed at an incline such that a gap between the second radiator and the first radiator widens on progression from the vehicle lower side to the vehicle upper side as viewed along the vehicle width direction. This enables the second radiator to function effectively on airflow being drawn in from the vehicle front-lower side.

An electric vehicle cooling system according to a fourth aspect of the present disclosure is any aspect from out of the first aspect to the third aspect, further including a first outflow pipe and a first outflow pipe, a second outflow pipe and a second inflow pipe, a first bypass pipe, a second bypass pipe, and a flow path switching section. The first outflow pipe configured to allow cooling water cooled by the first radiator to flow out to a side of the power unit, and the first inflow pipe configured to allow the cooling water, which has flowed from the side of the power unit, to flow into the first radiator, both of the first outflow pipe and the first inflow pipe being connected to the first radiator. The second outflow pipe configured to allow cooling water cooled by the second radiator to flow out to a side of the autonomous driving control device, and the second inflow pipe configured to allow the cooling water, which has flowed from the side of the autonomous driving control device, to flow into the second radiator, both of the second outflow pipe and the second inflow pipe being connected to the second radiator. The first bypass pipe is disposed between the first outflow pipe and the second outflow pipe. The second bypass pipe is disposed between the first inflow pipe and the second inflow pipe. In a state in which a first heat exchange between the first radiator and the power unit is permitted and a second heat exchange between the second radiator and the side of the autonomous driving control device is permitted, the flow path switching section is configured to prevent a first connection through the first bypass pipe between the first outflow pipe and the second outflow pipe and to prevent a second connection through the second bypass pipe between the first inflow pipe and the second inflow pipe. The flow path switching section being configured to permit the first connection and the second connection in a state in which either of the first heat exchange or the second heat exchange is prevented.

According to the fourth aspect of the present disclosure the first outflow pipe and the first inflow pipe are connected to the first radiator. Thus cooling water cooled by the first radiator outflows to the side of the power unit through the first outflow pipe, enabling the power unit to be cooled with the cooling water. Moreover, cooling water flowing out from the side of the power unit through the first inflow pipe inflows to the first radiator, and the cooling water is cooled by the first radiator.

The second outflow pipe and the second inflow pipe are also connected to the second radiator. The cooling water cooled by the second radiator outflows to the side of the autonomous driving control device through the second outflow pipe, enabling the autonomous driving control device to be cooled with this cooling water. The cooling water that has flowed in from the side of the autonomous driving control device through the second inflow pipe inflows to the second radiator, and this cooling water is cooled by the second radiator.

Were a malfunction however to occur in the first radiator or the second radiator while the vehicle is traveling, then this might conceivably result in trouble with the travel and autonomous driving of the vehicle. In some embodiments, the radiator not malfunctioning from out of the first radiator and the second radiator is able to be switched over to function as the malfunctioning radiator while the vehicle is evacuating to a safety zone.

The present disclosure accordingly includes a first bypass pipe, a second bypass pipe, and a flow path switching section, enabling the cooling water flow path to be changed from the normal state in cases in which a malfunction has occurred in the first radiator or the second radiator.

More specifically, the first bypass pipe is disposed between the first outflow pipe and the second outflow pipe, and the second bypass pipe is disposed between the first inflow pipe and the second inflow pipe. The flow path switching section is configured so as to prevent the first connection through the first bypass pipe between the first outflow pipe and the second outflow pipe and prevent the second connection through the second bypass pipe between the first inflow pipe and the second inflow pipe in a state in which the first heat exchange between the first radiator and the power unit is permitted and the second heat exchange between the second radiator and the side of the autonomous driving control device is permitted, namely in a normal state in which the first radiator and the second radiator are functioning.

In other words, in a normal state in the present disclosure there are independent states for the first cooling circuit of the cooling water contained in the first radiator, the first outflow pipe, the first inflow pipe, and the power unit, and for the second cooling circuit of the cooling water contained in the second radiator, the second outflow pipe, the second inflow pipe and the autonomous driving control device.

However the flow path switching section is configured so as to permit the first connection and the second connection in a state in which one out of the first heat exchange and the second heat exchange is prevented, namely in an abnormal state in which the first radiator or the second radiator is not functioning.

In other words, in an abnormal state in the present disclosure, the first cooling circuit and the second cooling circuit are connected together, enabling a certain degree of cooling performance to be secured for the power unit and the autonomous driving control device by the functioning radiator from out of the first radiator and the second radiator.

As described above, the electric vehicle cooling system according to the first aspect of the present disclosure exhibits the effect in an electric vehicle capable of autonomous driving of being able to cool the autonomous driving control device while cooling the power unit.

The electric vehicle cooling system according to the second aspect of the present disclosure exhibits the effect of being able to suppress any increase in design change locations accompanying changes or the like to the specifications of the power unit and the autonomous driving control device.

The electric vehicle cooling system according to the third aspect of the present disclosure exhibits the effect of being able to utilize an opening provided in the vehicle front-lower side of a vehicle body of the vehicle to secure effective cooling of the autonomous driving control device.

The electric vehicle cooling system according to the fourth aspect of the present disclosure exhibits the effect of enabling a certain degree of traveling performance to be secured for the vehicle while in an abnormal state in which sufficient cooling performance is not able to be secured for the power unit and the autonomous driving control device.

BRIEF DESCRIPTION OF THE DRAWINGS

Exemplary embodiments of the present disclosure will be described in detail based on the following figures, wherein.

DETAILED DESCRIPTION

Explanation follows regarding an example of an exemplary embodiment of an electric vehicle cooling system according to the present disclosure, with reference to FIG. 1 to FIG. 9. Note that where appropriate in the drawings an arrow FR indicates a vehicle front side of a "vehicle 12" serving as an electric vehicle installed with an "electric vehicle cooling system 10" according to the present exemplary embodiment (hereafter referred to as "the cooling system 10"), an arrow UP indicates a vehicle upper side, and an arrow RH indicates a vehicle width direction right side.

Figure 9:
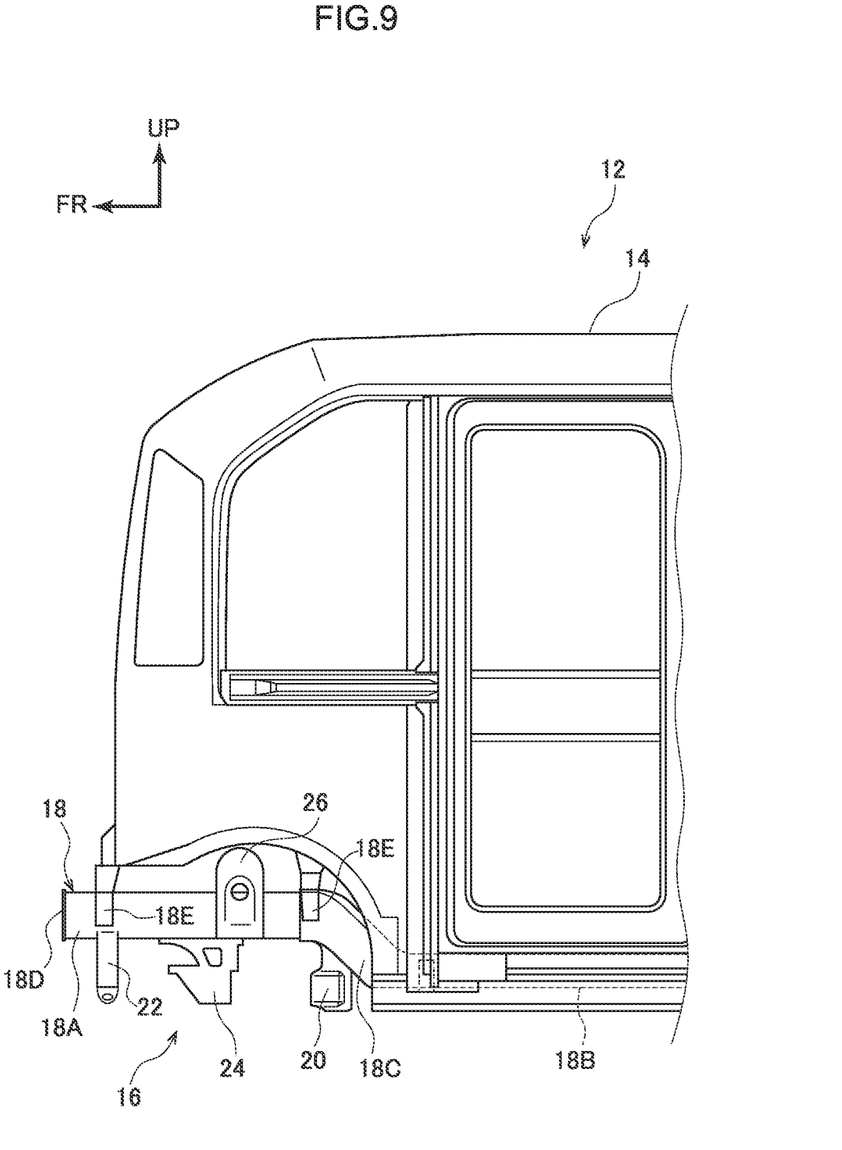
FIG. 9 is a side view schematically illustrating a configuration of a vehicle installed with an electric vehicle cooling system according to an exemplary embodiment.

As illustrated in FIG. 9, the vehicle 12 has a so-called frame structure, including a steel vehicle body 14, and a steel "frame 16" supporting the vehicle body 14.

Figure 7:
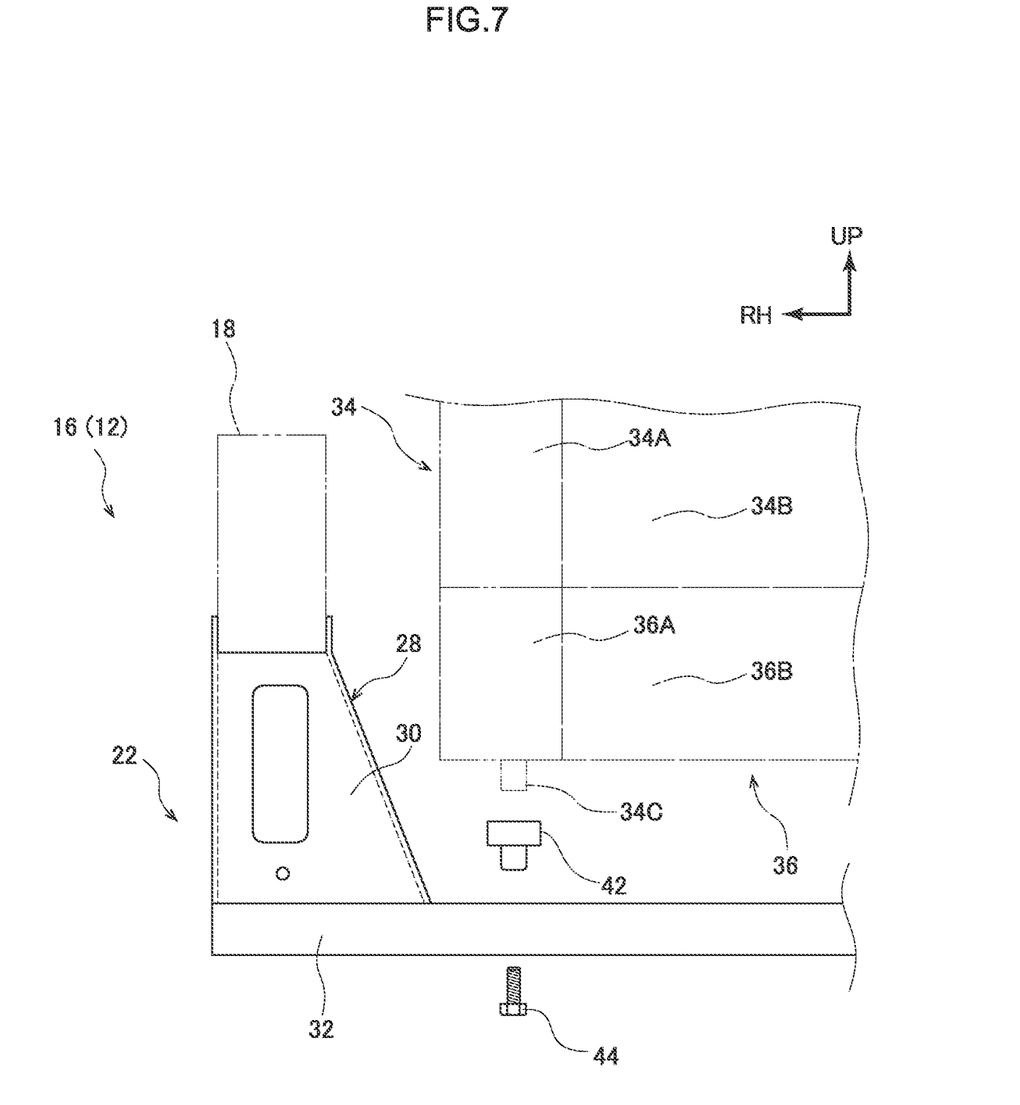
FIG. 7 is a partially exploded front-on view as viewed from a vehicle front side and illustrating how a first radiator and a second radiator of an electric vehicle cooling system according to an exemplary embodiment are attached to a frame.
Figure 8:
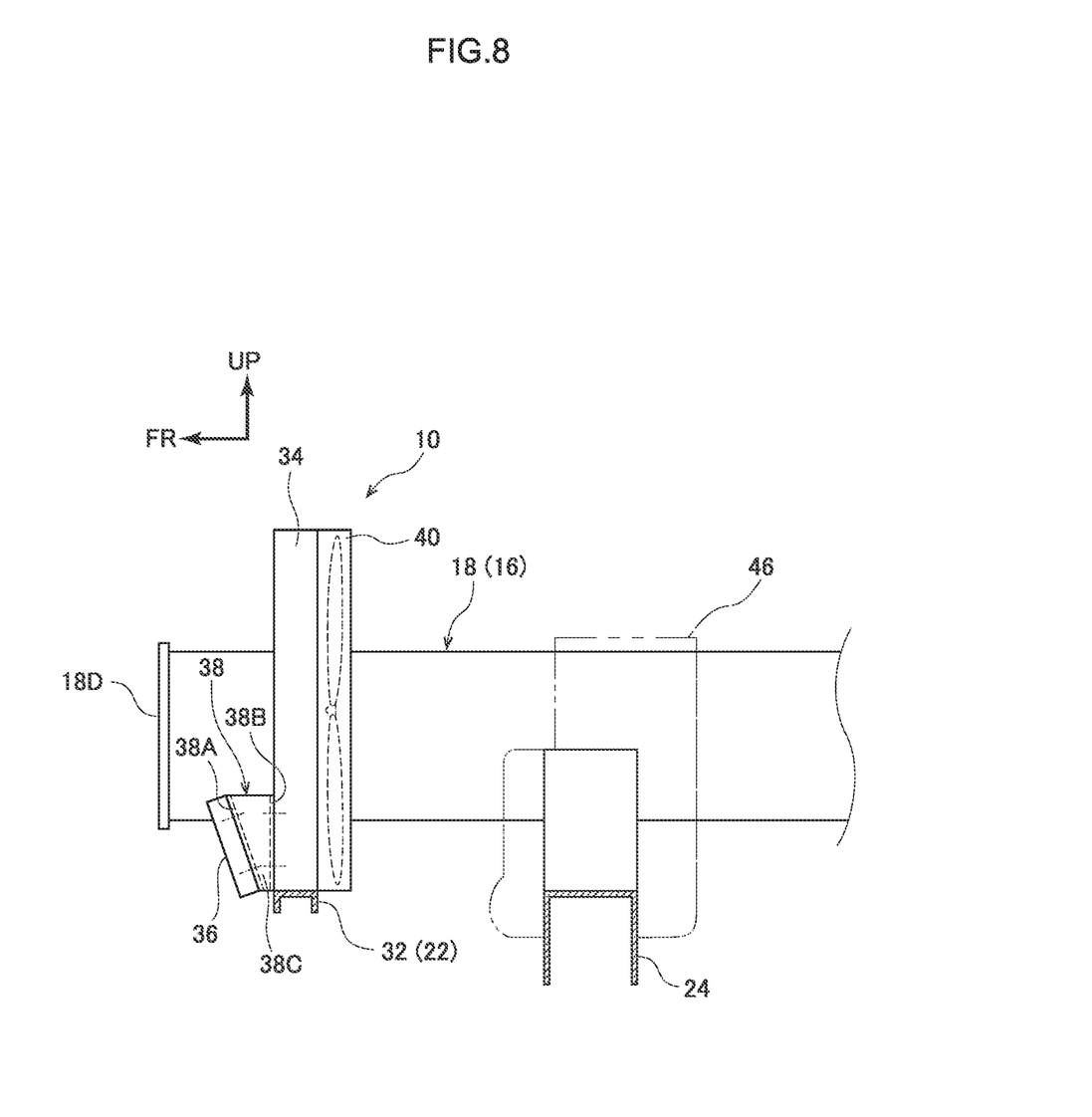
FIG. 8 is a side view as viewed along a vehicle width direction illustrating an attached state to a frame of a first radiator and a second radiator of an electric vehicle cooling system according to an exemplary embodiment.

As illustrated in FIG. 7 to FIG. 9, the frame 16 includes a pair of side frames 18 disposed separated from each other in a vehicle width direction, plural cross members 20 spanning between the side frames 18, a "radiator mount 22" serving as a support member, and a power unit section 24. Note that the frame 16 has a configuration that is basically symmetrical in a vehicle front-rear direction and the vehicle width direction, and where appropriate this will be taken into consideration to simplify the following explanation of the configuration of the frame 16.

The side frames 18 extend overall in the vehicle front-rear direction and are each configured including a front frame section 18A, a main frame section 18B, and a kicker section 18C. The side frames 18 have a closed cross-section structure with closed cross-sections in sections viewed along the vehicle front-rear direction.

More precisely, the front frame section 18A configures a vehicle front side section of the side frame 18 and extends in a straight line along the vehicle front-rear direction. An attachment plate 18D is provided at a vehicle front side end of the front frame section 18A, and non-illustrated front bumper reinforcement is attached to the attachment plate 18D.

A pair of mounting sections 18E for supporting a vehicle front side section of the vehicle body 14 are provided on each of the front frame sections 18A so as to be separated from each other in the vehicle front-rear direction. A suspension tower 26 is provided between the mounting sections 18E.

The main frame section 18B configures a vehicle front-rear direction central section of the side frame 18, is disposed at the vehicle width direction outside and vehicle lower side of the front frame section 18A, and extends in a straight line along the vehicle front-rear direction. Plural non-illustrated mounting portions for supporting a vehicle front-rear direction central section of the vehicle body 14 are provided to each of the main frame sections 18B so as to be separated from each other in the vehicle front-rear direction.

The kicker section 18C is interposed between the front frame section 18A and the main frame section 18B. The kicker section 18C extends from the front frame section 18A toward the vehicle rear side and toward the vehicle width direction outside when viewed along the vehicle height direction, and extends from the front frame section 18A toward the vehicle rear side and the vehicle lower side when viewed along the vehicle width direction.

The radiator mount 22 is configured including fixings 28 and a radiator support 32. The fixing 28 is provided to each of the pair of side frames 18. The fixings 28 each include a front member 30 configuring a vehicle front side section thereof, and a non-illustrated rear member configuring a vehicle rear side section thereof. The fixings 28 each have a trapezoidal box shape when viewed along the vehicle front-rear direction, with a width that increases from the vehicle upper side toward the vehicle lower side. The fixings 28 are joined at non-illustrated joints to a vehicle lower side of the side frames 18 by welding or the like.

The radiator support 32 is configured by U-shaped channel-section steel extending along the vehicle width direction and having a cross-section open toward the vehicle lower side when viewed along the vehicle width direction. The ends of the radiator support 32 are joined at non-illustrated joints to a vehicle lower side of the fixings 28 by welding or the like.

A pair of non-illustrated insertion sections are provided in the radiator support 32 so as to pass through in the vehicle height direction and be separated from each other in the vehicle width direction. A "first radiator 34" configuring part of the cooling system 10 is attached to the radiator support 32 using these insertion sections.

More specifically, the first radiator 34 is configured including a pair of tanks 34A capable of storing cooling water and respectively disposed at one side and another side of the first radiator 34 in the vehicle width direction, and a core section 34B disposed between the tanks 34A and employed to cool the cooling water.

Moreover, a circular cylinder shaped projection 34C provided with a non-illustrated female screw portion is provided to a vehicle lower end of each of the tanks 34A so as to project out from the end toward the vehicle lower side. A rubber bush 42 is attached to the projection 34C, and a bolt 44 that has been inserted through the insertion section is fastened to the projection 34C in a state in which a portion of the rubber bush 42 has been inserted into an insertion section of the radiator support 32, thereby fixing the first radiator 34 to the radiator support 32.

A "second radiator 36" configuring part of the cooling system 10 similarly to the first radiator 34 is attached to a vehicle front side portion of each of the tanks 34A and fixed thereto through a connecting member 38. More specifically, the second radiator 36 is configured basically the same as the first radiator 34 and includes a pair of tanks 36A and a core section 36B. However, the length of the second radiator 36 in the vehicle height direction is set to a length of about ⅓ the vehicle height direction length of the first radiator 34.

The connecting member 38 is configured including a front wall portion 38A configuring a vehicle front side section thereof, a rear wall 38B configuring a vehicle rear side section thereof, and a side wall 38C configuring a vehicle width direction outside section thereof. More specifically, the front wall portion 38A is plate shaped with a plate thickness direction substantially along the vehicle front-rear direction, and extends from the radiator support 32 side toward the vehicle front/upper side when viewed along the vehicle width direction. Moreover, the rear wall 38B is plate shaped with a plate thickness direction along the vehicle front-rear direction, and extends in the vehicle height direction when viewed along the vehicle width direction. The side wall 38C has a triangular plate shape with a plate thickness direction along the vehicle width direction, and a width that widens on progression toward the vehicle upper side when viewed along the vehicle width direction.

In the connecting members 38 configured as described above, the front wall portions 38A are attached to the tanks 36A of the second radiator 36 using non-illustrated attachment members, and the rear walls 38B are attached to the tanks 34A of the first radiator 34 using non-illustrated attachment members.

Namely, in the present exemplary embodiment, an integrated state is adopted in which the first radiators 34 and the second radiators 36 are integrated together through the connecting members 38, and the radiator mount 22 can be thought of as supporting the first radiators 34 and the second radiators 36. Moreover, the second radiators 36 are attached to the first radiators 34 through the connecting members 38, and the second radiators 36 are arranged in an inclined state such that a gap between the second radiators 36 and the first radiators 34 widen on progression from the vehicle lower side toward the vehicle upper side as viewed along the vehicle width direction.

A cooling fan 40 configuring part of the cooling system 10 is attached through a non-illustrated attachment member to a vehicle rear section of each of the tanks 34A. This results in a configuration in which the core section 34B of the first radiator 34 and the core section 36B of the second radiator 36 are cooled by the cooling fans 40.

The power unit mount 24 extends along the vehicle width direction, and connects the respective front frame sections 18A together in the vehicle width direction at a vehicle lower side of the suspension towers 26. A "power unit 46" driven by electrical power and configuring part of a travel control device 48 is attached to the power unit mount 24.

Moreover, a battery 86 (see FIG. 6) is disposed between the main frame sections 18B of the frame 16, and electrical power is supplied from the battery 86 to the power unit 46. The power unit 46 and the battery 86 configure part of the travel control device 48 controlling travel of the vehicle 12.

Figure 6:
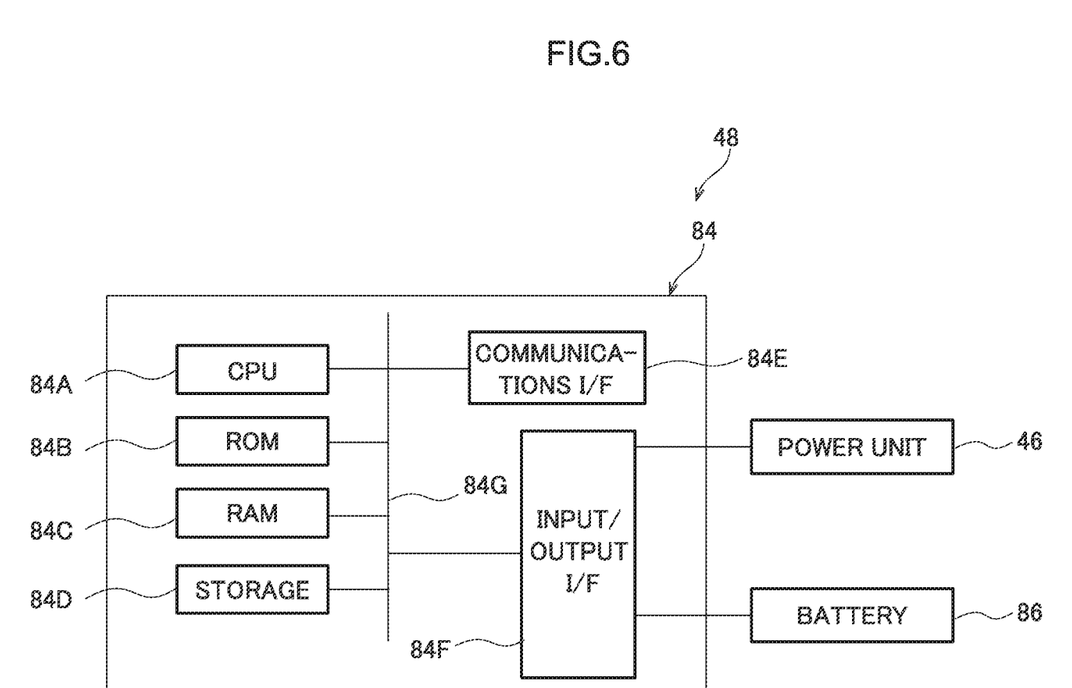
FIG. 6 is a block diagram illustrating a configuration of a main ECU installed at an electric vehicle according to an exemplary embodiment, and the periphery thereof.

More specifically, as illustrated in FIG. 6, the travel control device 48 includes the power unit 46 described above, the battery 86, and a main ECU 84 for controlling both of these. More precisely the main ECU 84 includes a central processing unit (CPU) 84A, read only memory (ROM) 84B, random access memory (RAM) 84C, storage 84D, a communications interface (I/F) 84E, and an input/output I/F 84F. The CPU 84A, the ROM 84B, the RAM 84C, the storage 84D, the communications I/F 84E, and the input/output I/F 84F are connected together through a bus 84G so as to be able to communicate with each other.

The CPU 84A is a central processing unit capable of controlling various equipment by executing various programs. Specifically, the CPU 84A reads a program from the ROM 84B and is able to execute the program using the RAM 84C as workspace. The main ECU 84 is able to exhibit various functions, as described later, by the CPU 84A reading and executing an execution program stored in the ROM 84B.

More specifically, various programs and various data related to controlling the power unit 46 and the battery 86 etc. are stored in the ROM 84B. The RAM 84C is able to act as a workspace for temporarily storing programs and data.

The storage 84D is configured including a hard disk drive (HDD) or an solid state drive (SSD), and is able to store various programs including an operating system.

The communications I/F 84E is an interface employed to connect the main ECU 84 with various networks, and is able to communicate with an autonomous driving ECU 72 and the like, described later. This interface employs a communication standard such as Ethernet (registered trademark), FDDI, Wi-Fi (registered trademark), or the like. The communications I/F 84E may be equipped with a wireless device.

The input/output I/F 84F is an interface the main ECU 84 employs to communicate with various devices installed in the vehicle 12. The main ECU 84 is connected through the input/output I/F 84F to the power unit 46 and the battery 86 so as to enable communication therebetween.

Figure 5:
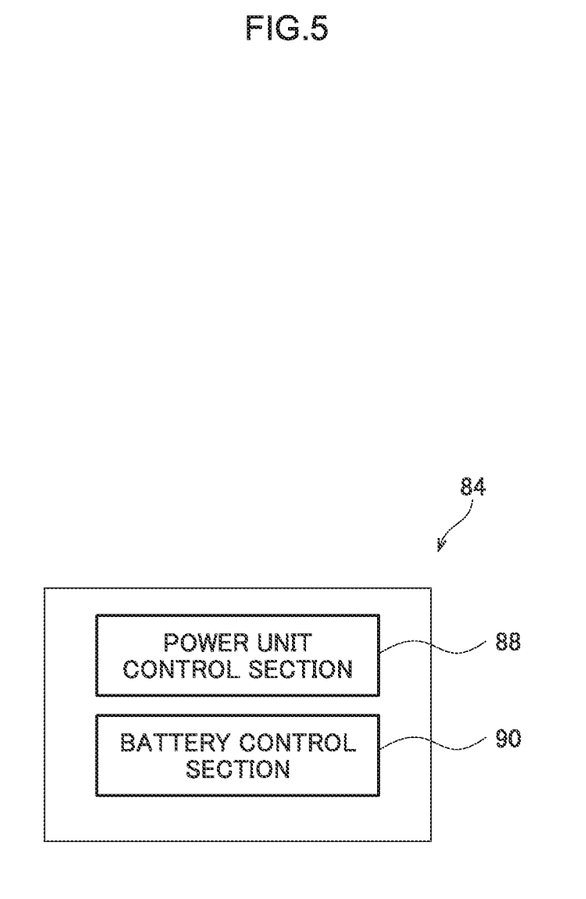
FIG. 5 is a block diagram illustrating a functional configuration of a main ECU installed at an electric vehicle according to an exemplary embodiment.

Next, description follows regarding a functional configuration of the main ECU 84, with reference to FIG. 5 and FIG. 6. In the main ECU 84, the CPU 84A reads an execution program stored in the ROM 84B, and by executing the program functions as an assembly configured by a power unit control section 88 and a battery control section 90.

More specifically, the power unit control section 88 controls the power unit 46 according to an operation signal based on operational input by a driver through a non-illustrated operation device and based on a control signal input from the autonomous driving ECU 72, described later.

The battery control section 90 controls the battery 86 so that the electrical power required to drive the power unit 46 is supplied from the battery 86 to the power unit 46 under control of the power unit control section 88. When input with a signal from the autonomous driving ECU 72, described later, indicating malfunction of an "autonomous driving control device 50", the power unit control section 88 and the battery control section 90 are configured to control the power unit 46 and the battery 86 so as to decrease the output of the power unit 46, and to thereby restrict the vehicle 12 from traveling at a specific speed or greater.

The vehicle body 14 has a substantially cuboid box shape configuration with an external shape extending along the vehicle front-rear direction, and configures the main portion of a vehicle cabin that is the occupation space of an occupant. The vehicle body 14 is configured so as to be basically symmetrical in both the vehicle front-rear direction and the vehicle width direction.

Figure 1:
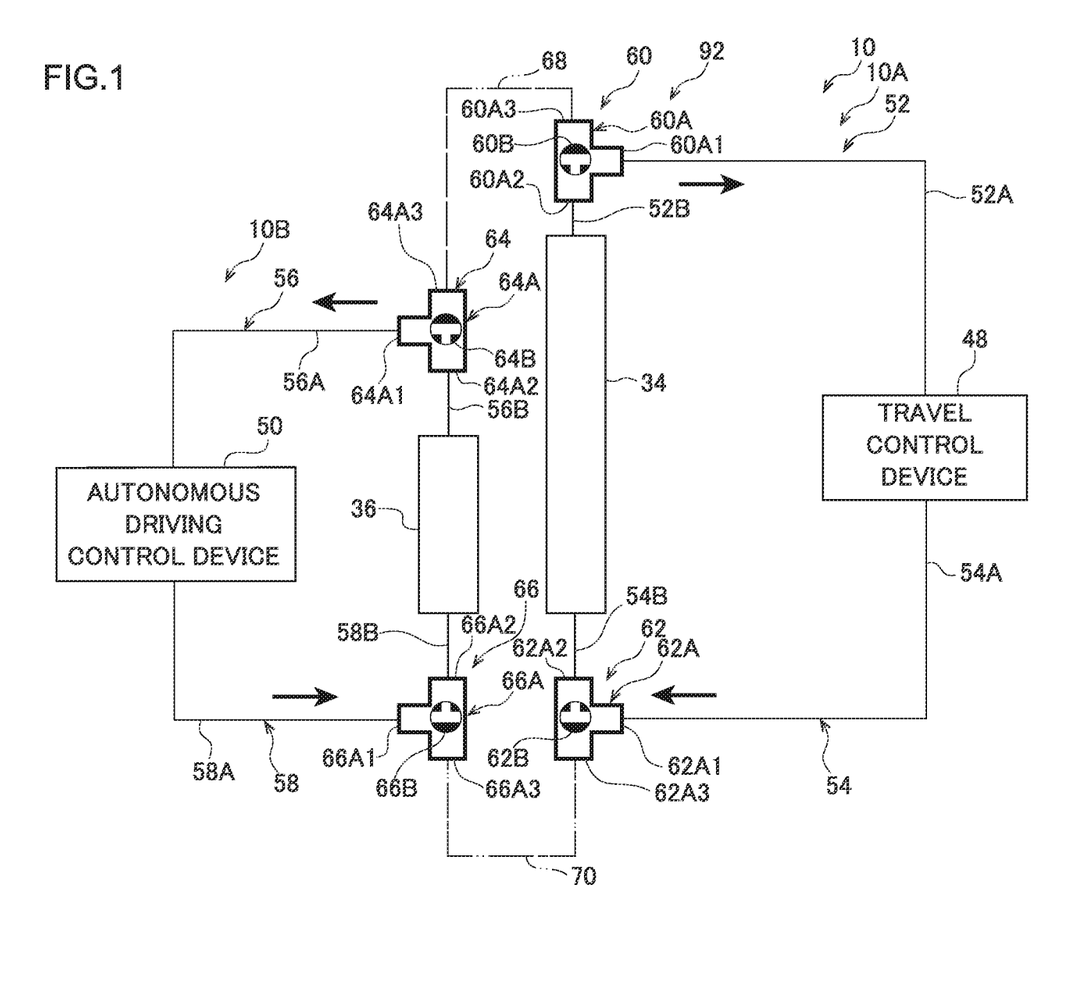
FIG. 1 is a circuit diagram schematically illustrating a normal state of an electric vehicle cooling system according to an exemplary embodiment.

As illustrated in FIG. 1, the cooling system 10 according to the present exemplary embodiment is configured including a first cooling circuit 10A and a second cooling circuit 10B. The first cooling circuit 10A and the second cooling circuit 10B have a feature of being connectable through a "first bypass pipe 68" and a "second bypass pipe 70" in specific circumstances. Explanation follows regarding details of a configuration of the cooling system 10.

The first cooling circuit 10A is normally configured so as to be employed to cool the travel control device 48, and includes a "first outflow pipe 52", a "first inflow pipe 54", a three-way valve 60, and a three-way valve 62.

The first outflow pipe 52 is configured including a pipe 52A and a pipe 52B. One end of the pipe 52A is connected to the travel control device 48, and another end of the pipe 52A is connected to the three-way valve 60. One end of the pipe 52B is connected to a non-illustrated outflow port provided to the first radiator 34 for outflow of cooling water cooled by the first radiator 34, and another end of the pipe 52B is connected to the three-way valve 60.

The first inflow pipe 54 is configured including a pipe 54A and a pipe 54B. One end of the pipe 54A is connected to the travel control device 48, and another end of the pipe 54A is connected to the three-way valve 62. One end of the pipe 54B is connected to a non-illustrated inflow port provided to the first radiator 34 for inflow of cooling water employed to cool the travel control device 48, and another end of the pipe 54B is connected to the three-way valve 62.

The three-way valve 60 includes a body 60A and a ball 60B. More specifically, the body 60A includes a first port 60A1 connected to the pipe 52A, a second port 60A2 connected to the pipe 52B, and a third port 60A3 connected to the first bypass pipe 68.

A connection state between the first port 60A1, the second port 60A2, and the third port 60A3 is switchable by the ball 60B housed inside the body 60A being driven by a non-illustrated actuator.

The three-way valve 62 is configured similarly to the three-way valve 60 and includes a body 62A and a ball 62B. The pipe 54A is connected to a first port 62A1 of the body 62A, the pipe 54B is connected to a second port 62A2, and the second bypass pipe 70 is connected to a third port 62A3.

The second cooling circuit 10B is normally configured so as to be employed to cool the autonomous driving control device 50, and includes a "second outflow pipe 56", a "second inflow pipe 58", a three-way valve 64, and a three-way valve 66. Detailed description of the autonomous driving control device 50 is described later.

The second outflow pipe 56 is configured including a pipe 56A and a pipe 56B. One end of the pipe 56A is connected to the autonomous driving control device 50, and another end of the pipe 56A is connected to the three-way valve 64. One end of the pipe 56B is connected to a non-illustrated outflow port provided to the second radiator 36 for outflow of cooling water cooled by the second radiator 36, and another end of the pipe 56B is connected to the three-way valve 64.

The second inflow pipe 58 is configured including a pipe 58A and a pipe 58B. One end of the pipe 58A is connected to the autonomous driving control device 50, and another end of the pipe 58A is connected to the three-way valve 66. One end of the pipe 58B is connected to a non-illustrated inflow port provided to the second radiator 36 for inflow of cooling water employed to cool the autonomous driving control device 50, and another end of the pipe 58B is connected to the three-way valve 66.

The three-way valve 64 is configured similarly to the three-way valve 60 and includes a body 64A and a ball 64B. The pipe 56A is connected to a first port 64A1 of the body 64A, the pipe 56B is connected to a second port 64A2, and the first bypass pipe 68 is connected to a third port 64A3.

The three-way valve 66 is configured similarly to the three-way valve 60 and includes a body 66A and a ball 66B. The pipe 58A is connected to a first port 66A1 of the body 66A, the pipe 58B is connected to a second port 66A2, and the second bypass pipe 70 is connected to a third port 66A3.

Figure 2:
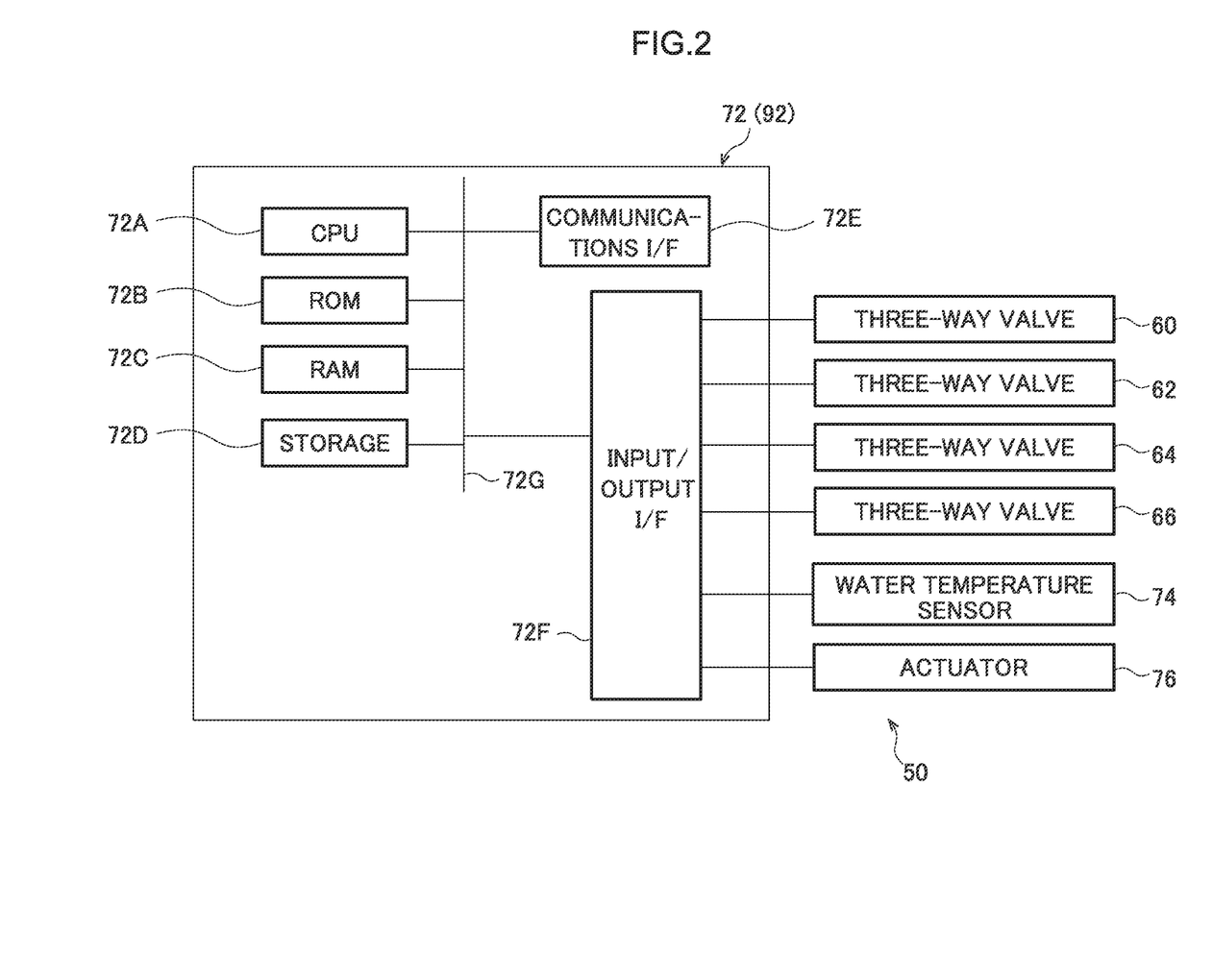
FIG. 2 is a block diagram illustrating a configuration of an autonomous driving ECU installed at an electric vehicle according to an exemplary embodiment, and the periphery thereof.

Explanation follows regarding configuration of the autonomous driving control device 50, with reference to FIG. 2. The autonomous driving control device 50 is configured including the autonomous driving ECU 72 and an autonomous driving actuator 76.

The autonomous driving ECU 72 is configured basically the same as the main ECU 84 described above, and is configured including a CPU 72A, ROM 72B, RAM 72C, storage 72D, a communications I/F 72E, an input/output I/F 72F, and a bus 72G. Note that a program related to autonomous driving of the vehicle 12, and a program related to control of the three-way valve 60, the three-way valve 62, the three-way valve 64, and the three-way valve 66, are stored in the ROM 72B. Various data needed for autonomous driving of the vehicle 12 are storable in the storage 72D.

Moreover, the autonomous driving ECU 72 is connected so as to be able to communicate through the input/output I/F 72F with the three-way valve 60, the three-way valve 62, the three-way valve 64, the three-way valve 66, a water temperature sensor 74, and the autonomous driving actuator 76. Specifically, the water temperature sensor 74 is configured so as to output a signal based on the temperature of cooling water flowing in the second cooling circuit 10B to the autonomous driving ECU 72.

The autonomous driving actuator 76 is configured including a non-illustrated throttle actuator, brake actuator, and steering actuator. During autonomous driving of the vehicle 12, the autonomous driving actuator 76 is able to control non-illustrated drive unit including an accelerator device, a braking device, and a steering device based on control signals output from the autonomous driving ECU 72.

Figure 3:
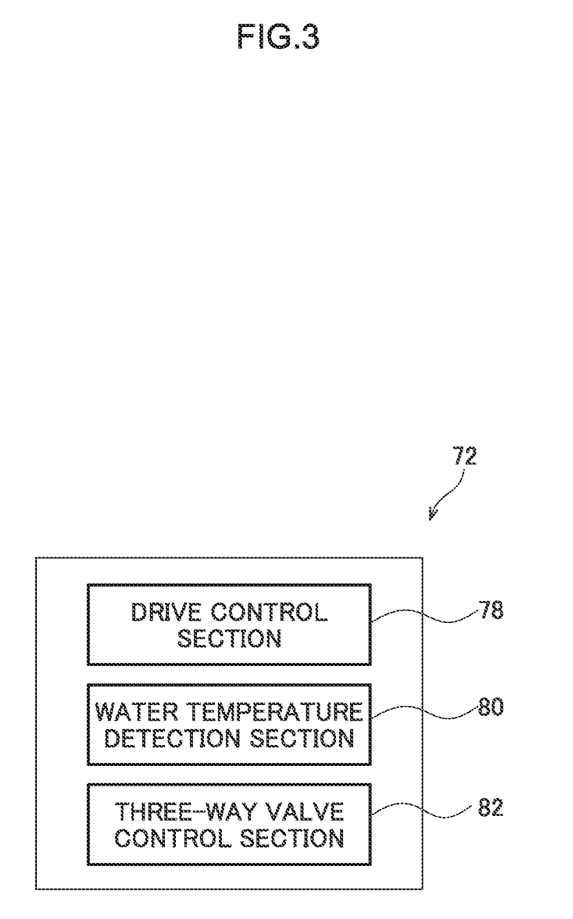
FIG. 3 is a block diagram illustrating a functional configuration of an autonomous driving ECU installed at an electric vehicle according to an exemplary embodiment.

Next explanation follows regarding a functional configuration of the autonomous driving ECU 72, with reference to FIG. 3. In the autonomous driving ECU 72, the CPU 72A reads an execution program stored in the ROM 72B, and by executing this program functions as an assembly configured by a drive control section 78, a water temperature detection section 80, and a three-way valve control section 82.

During autonomous driving of the vehicle 12, the drive control section 78 controls the autonomous driving actuator 76 based on a program stored in the ROM 72B and various data stored in the storage 72D, and drives the drive unit of the vehicle 12.

The water temperature detection section 80 detects a temperature of cooling water flowing in the second cooling circuit 10B based on a signal input from the water temperature sensor 74, and determines whether or not the temperature is an upper limit temperature at which the autonomous driving ECU 72 is capable of correct operation or greater. The water temperature detection section 80 is configured to output an abnormal signal to the drive control section 78 in cases in which the temperature of the cooling water flowing in the second cooling circuit 10B is the upper limit temperature for correct operation of the autonomous driving ECU 72 or greater.

Note that when input with the abnormal signal from the water temperature detection section 80, the drive control section 78 controls the autonomous driving actuator 76 so as to cause the vehicle 12 to evacuate to a safety zone. Moreover, the water temperature detection section 80 is configured so as to output a signal indicating malfunction of the autonomous driving control device 50 to the main ECU 84 in cases in which the temperature of the cooling water is the upper limit temperature or greater.

The three-way valve control section 82 is able to change the cooling water flow path in the cooling system 10 by controlling the actuator to drive the ball 60B, the actuator to drive the ball 62B, the actuator to drive the ball 64B, and the actuator to drive the ball 66B.

Specifically, in a normal state in the present exemplary embodiment in which the second radiator 36 is functioning correctly, as illustrated in FIG. 1, the three-way valve control section 82 communicates the first port 60A1 and the second port 60A2 of the three-way valve 60 and also communicates the first port 62A1 and the second port 62A2 of the three-way valve 62, such that the cooling water flowing in the travel control device 48 is cooled only in the first radiator 34.

Moreover, in this state, the three-way valve control section 82 communicates the first port 64A1 and the second port 64A2 of the three-way valve 64 and also communicates the first port 66A1 and the second port 66A2 of the three-way valve 66, such that the cooling water flowing in the autonomous driving control device 50 is cooled only in the second radiator 36.

Figure 4:
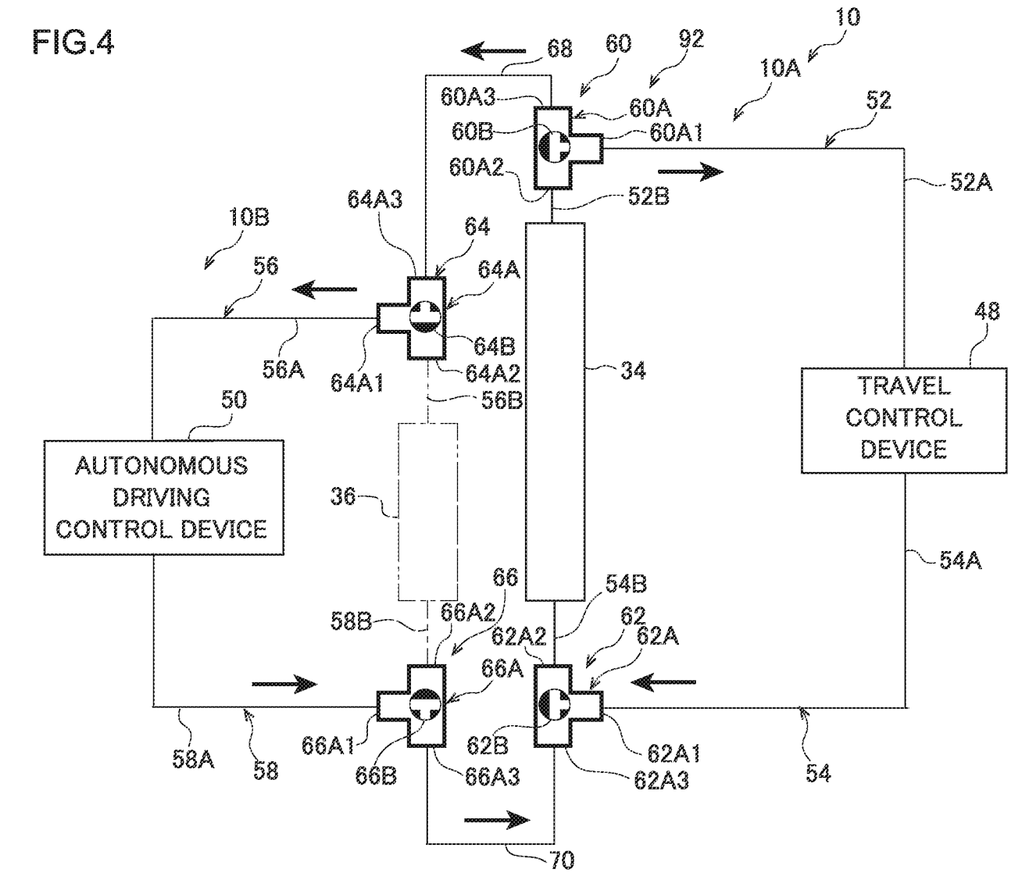
FIG. 4 is a circuit diagram schematically illustrating an abnormal state of an electric vehicle cooling system according to an exemplary embodiment.

However, in an abnormal state in which an abnormal signal is being output from the water temperature detection section 80 to the three-way valve control section 82, as illustrated in FIG. 4, the three-way valve control section 82 communicates the first port 60A1, the second port 60A2, and the third port 60A3 of the three-way valve 60 together and also communicates the first port 62A1, the second port 62A2, and the third port 62A3 of the three-way valve 62 together. Namely, in the abnormal state, the cooling water outflowing from the first radiator 34 flows not only to the travel control device 48 but flows to the three-way valve 64 side through the first bypass pipe 68, such that the cooling water from the second cooling circuit 10B side inflows to the first radiator 34 through the second bypass pipe 70 and the three-way valve 62.

Moreover, in this state the three-way valve control section 82 communicates the first port 64A1 and the third port 64A3 of the three-way valve 64 and also communicates the first port 66A1 and the third port 66A3 of the three-way valve 66. Namely, in the abnormal state, the cooling water flowing in from the first radiator 34 side through the first bypass pipe 68 flows to the autonomous driving control device 50, and the cooling water flowing in from the autonomous driving control device 50 to the three-way valve 62 through the second bypass pipe 70 inflows to the first radiator 34.

Namely, in the present exemplary embodiment, in the abnormal state, the second radiator 36 is isolated from the second cooling circuit 10B using the three-way valve 60, the three-way valve 62, the three-way valve 64, the three-way valve 66, and the autonomous driving ECU 72, such that the travel control device 48 and the autonomous driving control device 50 are cooled by the first radiator 34. Namely, the three-way valve 60, the three-way valve 62, the three-way valve 64, the three-way valve 66, and the autonomous driving ECU 72 perform switching of flow path in the cooling system 10, and in the following this assembly is referred to as a "flow path switching section 92".

Operation and Effects of the Present Exemplary Embodiment

Explanation follows regarding the operation and effects of the present exemplary embodiment.

As illustrated in FIG. 1, in the present exemplary embodiment the first radiator 34 is installed at the vehicle 12, and even if the power unit 46 (see FIG. 6) is heated up due to the power unit 46 of the vehicle 12 being driven by electrical power, the power unit 46 can be cooled by the first radiator 34.

In some embodiments, an autonomous driving control device 50 to control autonomous driving of the vehicle 12 is also able to be cooled in cases in which the autonomous driving control device 50 is installed at the vehicle 12. In regard to this point, although one might consider cooling the autonomous driving control device 50 with the first radiator 34, in some embodiments, there is a separate radiator installed at the vehicle 12 for cases in which the operating temperature and the required heat dissipation amount for the autonomous driving control device 50 differ from the operating temperature and the required heat dissipation amount for the power unit 46.

The present exemplary embodiment is accordingly also equipped with the second radiator 36, enabling the autonomous driving control device 50 heated up by operation to be cooled with the second radiator 36. Moreover, the specification of the second radiator 36 can be appropriately set for the operating temperature and the required heat dissipation amount for the autonomous driving control device 50.

Thus in the present exemplary embodiment, in the vehicle 12, which is an electric vehicle capable of autonomous driving, the autonomous driving control device 50 can be cooled while cooling the power unit 46.

Moreover, as illustrated in FIG. 8, in the present exemplary embodiment the first radiator 34 and the second radiator 36 can be supported at the frame 16 of the vehicle 12 via a common support member, namely through the radiator mount 22. This means that even were the size or the like of the first radiator 34 and the second radiator 36 to change according to the specifications of the power unit 46 and the autonomous driving control device 50, the locations where a design change is required can be limited to the radiator mount 22 and portions peripheral thereto.

The present exemplary embodiment is accordingly able to suppress any increase in design change locations accompanying change to the specifications or the like of the power unit 46 and the autonomous driving control device 50.

Moreover, in the present exemplary embodiment, the second radiator 36 is disposed at an incline such that when viewed along the vehicle width direction the gap between the second radiator 36 and the first radiator 34 widens on progression from the vehicle lower side toward the vehicle upper side. This enables the second radiator 36 to function effectively on an airflow being drawn in from the vehicle front-lower side.

The present exemplary embodiment is accordingly able to utilize an opening provided in the vehicle front-lower side of the vehicle body 14 of the vehicle 12 to enable effective cooling of the autonomous driving control device 50 to be secured.

In addition, in the present exemplary embodiment, as illustrated in FIG. 1, the first outflow pipe 52 and the first inflow pipe 54 are connected to the first radiator 34. Cooling water cooled by the first radiator 34 outflows to the power unit 46 (see FIG. 6) side through the first outflow pipe 52, enabling this cooling water to cool the power unit 46. Moreover, the cooling water that has flowed in from the power unit 46 side through the first inflow pipe 54 inflows to the first radiator 34, and this cooling water is cooled by the first radiator 34.

The second outflow pipe 56 and the second inflow pipe 58 are connected to the second radiator 36. The cooling water that has been cooled in the second radiator 36 outflows to the autonomous driving control device 50 side through the second outflow pipe 56, enabling the autonomous driving control device 50 to be cooled with the cooling water. Moreover, the cooling water flowing in from the autonomous driving control device 50 side through the second inflow pipe 58 inflows to the second radiator 36, and this cooling water is cooled by the second radiator 36.

Were a malfunction however to occur in the second radiator 36 when the vehicle 12 is traveling, then this might conceivably result in trouble with the autonomous driving of the vehicle 12. In some embodiments, the first radiator 34 is able to be switched over to function as the malfunctioning second radiator 36 while the vehicle 12 is evacuating to a safety zone.

The present exemplary embodiment accordingly also includes the first bypass pipe 68, the second bypass pipe 70, and the flow path switching section 92, enabling the cooling water flow path to be changed, from the normal state, when a malfunction has occurred in the second radiator 36.

More specifically, the first bypass pipe 68 is disposed between the first outflow pipe 52 and the second outflow pipe 56, and the second bypass pipe 70 is disposed between the first inflow pipe 54 and the second inflow pipe 58. Then, in a state in which the flow path switching section 92 permits a first heat exchange between the first radiator 34 and the power unit 46, and permits a second heat exchange between the second radiator 36 and the autonomous driving control device 50 side, namely a normal state in which the first radiator 34 and the second radiator 36 are both functioning, a first connection is restricted between the first outflow pipe 52 and the second outflow pipe 56 through the first bypass pipe 68, and a second connection is restricted between the first inflow pipe 54 and the second inflow pipe 58 through the second bypass pipe 70.

In other words, in a normal state in the present exemplary embodiment there are independent states for the first cooling circuit 10A of the cooling water contained in the first radiator 34, the first outflow pipe 52, the first inflow pipe 54, and the power unit 46, and for the second cooling circuit 10B of the cooling water contained in the second radiator 36, the second outflow pipe 56, the second inflow pipe 58 and the autonomous driving control device 50.

However, in a state in which the second heat exchange is prevented, namely an abnormal state in which the second radiator 36 is not functioning, the flow path switching section 92 is configured so as to permit the first connection and the second connection, as illustrated in FIG. 4.

Namely, in an abnormal state of the present exemplary embodiment, the first cooling circuit 10A and the second cooling circuit 10B are connected together, enabling a certain degree of cooling performance to be secured by the first radiator 34 for both the power unit 46 and the autonomous driving control device 50. Thus the present exemplary embodiment enables a certain degree of traveling performance to be secured for the vehicle 12 while in an abnormal state in which sufficient cooling performance is not able to be secured for both the power unit 46 and the autonomous driving control device 50.

Supplementary Explanation to Above Exemplary Embodiment (1) In the exemplary embodiment described above, in a state in which the second radiator 36 is not functioning the power unit 46 and the autonomous driving control device 50 are cooled by the first radiator 34, however, there is no limitation thereto. Namely, according to the specification and the like of the second radiator 36, a configuration may be adopted in which the power unit 46 and the autonomous driving control device 50 are cooled by the second radiator 36 in a state in which the first radiator 34 is not functioning.

(2) Moreover, although in the exemplary embodiment described above plural three-way valves are employed in flow path switching of the cooling system 10, there is no limitation thereto. For example, the first outflow pipe 52, the first inflow pipe 54, the second outflow pipe 56, and the second inflow pipe 58 may be connected to solenoid valves equipped with plural ports, and a configuration may be adopted so as to perform flow path switching of the cooling system 10 by controlling the solenoid valves with the autonomous driving ECU 72.

What is claimed is:

1. An electric vehicle cooling system, comprising:
   a first radiator installed at a vehicle and configured to cool a power unit driven by electrical power;
   a second radiator installed at the vehicle, disposed at a vehicle front side of the first radiator, and configured to cool an autonomous driving control device configured to control autonomous driving of the vehicle;
   a first outflow pipe configured to allow cooling water cooled by the first radiator to flow out to a side of the power unit, and a first inflow pipe configured to allow the cooling water, which has flowed from the side of the power unit, to flow into the first radiator, both of the first outflow pipe and the first inflow pipe being connected to the first radiator;
   a second outflow pipe configured to allow cooling water cooled by the second radiator to flow out to a side of the autonomous driving control device, and a second inflow pipe configured to allow the cooling water, which has flowed from the side of the autonomous driving control device, to flow into the second radiator, both of the second outflow pipe and the second inflow pipe being connected to the second radiator;
   a first bypass pipe disposed between the first outflow pipe and the second outflow pipe;
   a second bypass pipe disposed between the first inflow pipe and the second inflow pipe; and
   a flow path switching section that, in a state in which a first heat exchange between the first radiator and the power unit is permitted and a second heat exchange between the second radiator and the side of the autonomous driving control device is permitted, is configured to prevent a first connection through the first bypass pipe between the first outflow pipe and the second outflow pipe and to prevent a second connection through the second bypass pipe between the first inflow pipe and the second inflow pipe, the flow path switching section being configured to permit the first connection and the second connection in a state in which either of the first heat exchange or the second heat exchange is prevented.

2. The electric vehicle cooling system of claim 1, wherein the first radiator and the second radiator are supported at a frame of the vehicle via a common support member.

3. The electric vehicle cooling system of claim 1, wherein the second radiator is disposed at an incline such that a gap between the second radiator and the first radiator widens on progression from a vehicle lower side to a vehicle upper side as viewed along a vehicle width direction.

4. The electric vehicle cooling system of claim 2, wherein the second radiator is disposed at an incline such that a gap between the second radiator and the first radiator widens on progression from a vehicle lower side to a vehicle upper side as viewed along a vehicle width direction.

* * * * *